US008953346B2

(12) United States Patent
Cheng

(10) Patent No.: US 8,953,346 B2

(45) Date of Patent: Feb. 10, 2015

(54) CONVERTING CIRCUIT FOR CONVERTING INPUT VOLTAGE INTO OUTPUT CURRENT

(75) Inventor: Chi-Kai Cheng, New Taipei (TW)

(73) Assignee: Via Telecom Co., Ltd., George Town, Grand Cayman (KY)

( * ) Notice: Subject to any disclaimer, the term of this patent is extended or adjusted under 35 U.S.C. 154(b) by 189 days.

(21) Appl. No.: 13/560,364

(22) Filed: Jul. 27, 2012

(65) Prior Publication Data

US 2013/0027017 A1 Jan. 31, 2013

(30) Foreign Application Priority Data

Jul. 29, 2011 (CN) .......................... 2011 1 0217009

(51) Int. Cl.

*H02M 7/00* (2006.01)
*G05F 3/16* (2006.01)
*G05F 1/56* (2006.01)

(52) U.S. Cl.

CPC ...................................... *G05F 1/561* (2013.01)
USPC ............................................ 363/73; 323/316

(58) Field of Classification Search

USPC .......................... 323/311-316; 330/253-257; 327/538-539, 543; 363/73
See application file for complete search history.

(56) References Cited

U.S. PATENT DOCUMENTS

| | | | | |
|---|---|---|---|---|
| 4,251,743 | A * | 2/1981 | Hareyama | 327/538 |
| 4,496,885 | A * | 1/1985 | Nitschke | 318/122 |
| 4,695,806 | A * | 9/1987 | Barrett | 330/254 |
| 5,043,652 | A * | 8/1991 | Rybicki et al. | 323/316 |
| 5,157,350 | A * | 10/1992 | Rubens | 330/254 |
| 5,266,887 | A * | 11/1993 | Smith | 323/316 |
| 5,341,087 | A * | 8/1994 | Van Leeuwen | 323/315 |
| 5,404,097 | A * | 4/1995 | Barou | 323/312 |
| 5,493,205 | A * | 2/1996 | Gorecki | 323/315 |
| 5,525,897 | A * | 6/1996 | Smith | 323/315 |
| 5,774,020 | A * | 6/1998 | Kimura | 330/252 |
| 5,936,393 | A * | 8/1999 | Nauta | 323/316 |
| 5,978,241 | A * | 11/1999 | Lee | 363/73 |
| 6,060,870 | A * | 5/2000 | Seevinck | 323/273 |
| 6,346,804 | B2 * | 2/2002 | Ueno et al. | 323/315 |
| 6,587,000 | B2 * | 7/2003 | Oikawa | 330/288 |
| 6,906,586 | B2 * | 6/2005 | Sakurai | 330/253 |
| 7,233,204 | B2 * | 6/2007 | Kim et al. | 330/260 |
| 7,368,989 | B2 * | 5/2008 | Luo et al. | 330/258 |
| 7,656,231 | B2 * | 2/2010 | Luo et al. | 330/258 |

(Continued)

FOREIGN PATENT DOCUMENTS

TW 201120604 A 6/2011

OTHER PUBLICATIONS

Cassia, M., et al.; "A Low-Power CMOS SAW-Less Quad Band WCDMA/HSPA/HSPA+/1X/EGPRS Transmitter;" IEEE Journal of Solid-State Circuits; vol. 44; No. 7; Jul. 2009; pp. 1897-1906.

*Primary Examiner* — Timothy J Dole
*Assistant Examiner* — Yusef Ahmed
(74) *Attorney, Agent, or Firm* — McClure, Qualey & Rodack, LLP

(57) ABSTRACT

A converting circuit for receiving an input voltage and generating an output current, including: a transistor, coupled to a supply voltage at a drain of the transistor, and a source of the transistor is coupled to a first voltage, and a gate of the transistor is coupled to the input voltage and a fixed voltage; and a resistor, coupled to the input voltage and the gate of the transistor, and the output current flows through the resistor, wherein the output current is related to the fixed voltage, the input voltage and the resistor.

13 Claims, 10 Drawing Sheets

(56) References Cited

U.S. PATENT DOCUMENTS

| | | | | |
|---|---|---|---|---|
| 7,737,733 | B2 * | 6/2010 | Yokomizo et al. | 327/103 |
| 7,760,022 | B2 * | 7/2010 | Yamada | 330/255 |
| 7,808,537 | B2 * | 10/2010 | Fujimura et al. | 348/300 |
| 8,018,210 | B2 | 9/2011 | Chen et al. | |
| 2003/0058047 | A1 * | 3/2003 | Sakurai | 330/253 |
| 2003/0146784 | A1 * | 8/2003 | LeChevalier | 327/538 |
| 2004/0207379 | A1 * | 10/2004 | Camara et al. | 323/313 |
| 2005/0134329 | A1 * | 6/2005 | Lee et al. | 327/103 |
| 2005/0195033 | A1 * | 9/2005 | Sakurai | 330/253 |
| 2005/0275460 | A1 * | 12/2005 | Botker | 330/257 |
| 2008/0174284 | A1 * | 7/2008 | Zhou et al. | 323/266 |
| 2008/0265853 | A1 * | 10/2008 | Chen et al. | 323/280 |
| 2010/0052635 | A1 * | 3/2010 | Wang | 323/280 |
| 2012/0025737 | A1 * | 2/2012 | Kikuchi et al. | 315/307 |

* cited by examiner

CONVERTING CIRCUIT FOR CONVERTING INPUT VOLTAGE INTO OUTPUT CURRENT

CROSS REFERENCE TO RELATED APPLICATIONS

This Application claims priority of China Patent Application No. CN 201110217009, filed on Jul. 29, 2011, the entirety of which is incorporated by reference herein.

BACKGROUND OF THE INVENTION

1. Field of the Invention

The invention relates to a voltage to current converting circuit, and more particularly to a voltage to current converting circuit that is capable of operating at a low voltage.

2. Description of the Related Art

In analog circuits, a transconductance circuit is a voltage to current converting circuit, which converts an input voltage into an output current for subsequently other circuits.

FIGS. 1A and 1B show a single-end mode and a differential mode for a conventional transconductance circuit, respectively. In FIG. 1A, a transistor M1 is coupled to a ground GND via a resistor R. An input voltage $V_i$ is used to control a gate of the transistor M1, to determine a current value of an output current $i_o$ flowing through the transistor M1. In FIG. 1B, a transistor M1 is coupled to the ground GND via a first current source, and a transistor M2 is coupled to the ground GND via a second current source, wherein the first and second current sources have the same current values $I_0$. In addition, a resistor R is coupled between the drains of two transistors M1 and M2. The input voltages $V_{i+}$ and $V_{i-}$ are a pair of differential signals, that are used to control the gates of the transistors M1 and M2, to determine a current value of the output current $i_{o+}$ flowing through the transistor M1 and a current value of the output current $i_{o-}$ flowing through the transistor M2. In the conventional transconductance circuit, the resistor R is much larger than the transconductance gm of each transistor, i.e.

$$R \gg \frac{1}{gm},$$

so as to obtain better linearity. Furthermore, the conventional transconductance circuit needs to operate at an operating range having a good linearity as the input voltages $V_{i+}$ and $V_{i-}$ are applied to the gates of the transistors M1 and M2 directly. However, the operating range is decreased when a supply voltage is decreased.

FIGS. 2A and 2B show a single-end mode and a differential mode for another conventional transconductance circuit, respectively. In FIG. 2A, a transistor M1 is coupled to the ground GDN via a resistor R, wherein a gate of the transistor M1 is coupled to an output terminal of an amplifier AMP1. By using a characteristic of virtual short between two input terminals of the amplifier AMP1, the voltages at two terminals of the resistor R are an input voltage $V_i$ and the ground GND, thereby an output current $i_o$ is obtained by applying the input voltage $V_i$ into the resistor R, i.e.

$$i_0 = \frac{V_i}{R}.$$

In FIG. 2B, a transistor M1 is coupled to the ground GND via a first current source, and a transistor M2 is coupled to the ground GND via a second current source, wherein the first and second current sources have the same current values $I_0$. A gate of the transistor M1 is coupled to an output terminal of an amplifier AMP1, and a gate of the transistor M2 is coupled to an output terminal of an amplifier AMP2. Furthermore, a resistor R is coupled between the first terminals of the amplifiers AMP1 and AMP2. The input voltages $V_{i+}$ and $V_{i-}$ are a pair of differential signals, wherein the input voltages $V_{i+}$ and $V_{i-}$ are applied to the second terminals of the amplifiers AMP1 and AMP2, respectively. Similarly, by using a characteristic of virtual short between two input terminals of each of the amplifiers AMP1 and AMP2, the output currents $i_{o+}$ and $i_{o-}$ are obtained by applying the input voltages $V_{i+}$ and $V_{i-}$ into the resistor R. Although the conventional transconductance circuits of FIGS. 2A and 2B use the amplifiers to overcome the problems of the conventional transconductance circuits of FIGS. 1A and 1B, the amplifiers AMP1 and AMP2 must maintain in the virtual short status thereof, so as to maintain better linearity. However, the operating range of the virtual short status is decreased for an amplifier when a supply voltage of the amplifier is decreased, thus it is hard to maintain linearity.

Following the advancement of process technology, integrated circuits (IC) can operate at a lower supply voltage, such as below 1.5V, so as to decrease power consumption for the IC. However, when the operating/supply voltage is decreased, the linearity of each conventional transconductance circuit of FIGS. 1A, 1B, 2A and 2B is decreased, and can not meet operating requests.

Therefore, a voltage to current converting circuit having better linearity is desired, that is capable of operating at a low voltage.

BRIEF SUMMARY OF THE INVENTION

Converting circuits for converting input voltage into output current are provided. An embodiment of a converting circuit for receiving an input voltage and generating an output current is provided. The converting circuit comprises: a transistor, coupled to a supply voltage at a drain of the transistor, and a source of the transistor is coupled to a first voltage, and a gate of the transistor is coupled to the input voltage and a fixed voltage; and a resistor, coupled to the input voltage and the gate of the transistor, and the output current flows through the resistor, wherein the output current is related to the fixed voltage, the input voltage and the resistor.

Furthermore, another embodiment of a converting circuit for receiving a plurality of input voltages and generating a plurality of output currents is provided. The converting circuit comprises a first transistor, coupled to a first supply voltage at a drain of the transistor, and a source the first transistor is coupled to a first voltage; a first amplifier, having a first input terminal for receiving a fixed voltage, a second input terminal coupled to a first input voltage, and an output terminal coupled to a gate of the first transistor; a first resistor, coupled to the first input voltage and the second input terminal of the first amplifier, and a first output current flows through the first resistor; a second transistor, coupled to a second supply voltage at a drain of the second transistor, and a source of the second transistor is coupled to a second voltage; a second amplifier, having a first input terminal for receiving the fixed voltage, a second input terminal coupled to a second input voltage, and an output terminal coupled to a gate of the second transistor; and a second resistor, coupled to the second input voltage and the second input terminal of the second amplifier, and a second output current flows through the second resistor.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
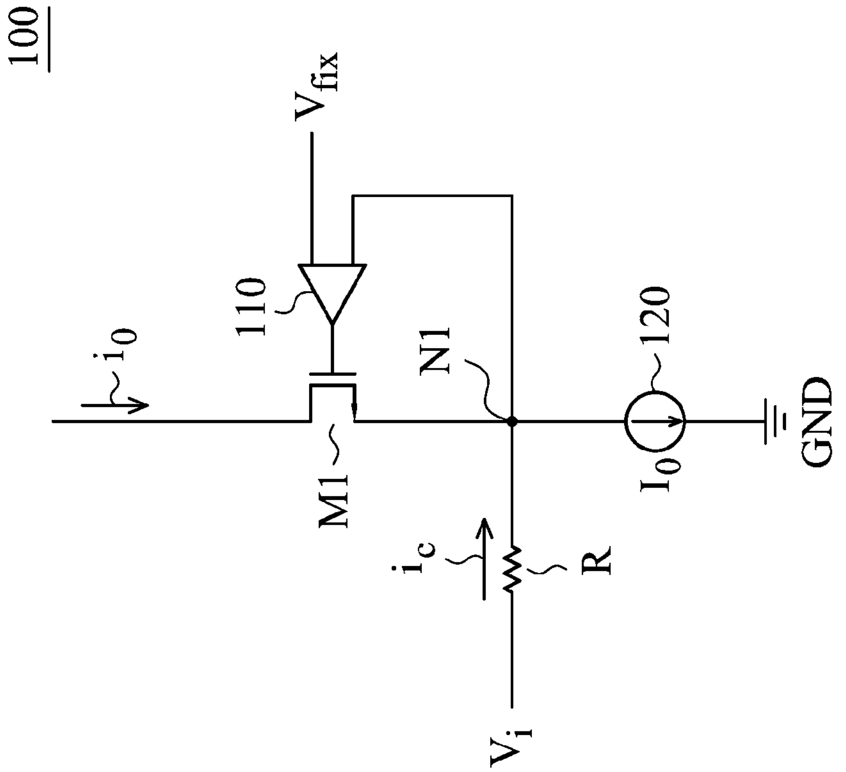
FIG. 3 shows a voltage to current converting circuit according to an embodiment of the invention, wherein the voltage to current converting circuit operates in a single-end mode.

FIG. 3 shows a voltage to current converting circuit 100 according to an embodiment of the invention, wherein the voltage to current converting circuit 100 operates in a single-end mode. The voltage to current converting circuit 100 comprises a transistor M1, a resistor R, an amplifier 110 and a current source 120, wherein the transistor M1 is an NMOS transistor. The transistor M1 being an NMOS transistor is an example and does not intend to limit the invention. The current source 120 is coupled between a ground GND and a node N1, wherein a current value of the current source 120 is $I_0$. An output terminal of the amplifier 110 is coupled to a gate of the transistor M1. A first input terminal of the amplifier 110 is used to receive a fixed voltage $V_{fix}$, and a second input terminal of the amplifier 110 is coupled to the node N1. One terminal of the resistor R is also coupled to the node N1, and an input voltage $V_i$ is applied to another terminal of the resistor R. Thus, the input voltage $V_i$ is not directly inputted to the gate of the transistor M1, thereby the problem of the conventional transconductance circuit of FIG. 1A that the operating range is decreased when a supply voltage is decreased is avoided. Furthermore, for the amplifier 110, the input voltage $V_i$ is directly applied to one terminal of the resistor R, and a voltage value of the fixed voltage $V_{fix}$ is a predetermined fixed voltage. By using a characteristic of virtual short between two input terminals of the amplifier 110, the voltages at two terminals of the resistor R are the input voltage $V_i$ and the fixed voltage $V_{fix}$, thereby a current $i_c$ flowing through the resistor R is $$\frac{V_i - V_{fix}}{R}.$$

Therefore, an output current $i_o$ is obtained according to the current value $I_0$ and the current $i_c$ flowing through the resistor R, i.e. $i_o = I_0 - i_c$. It is to be noted that a direction of the current $i_c$ is an example and does not intend to limit the invention. In actual applications, the direction of the current $i_c$ is determined according to the input voltage $V_i$ and the fixed voltage $V_{fix}$. The fixed voltage $V_{fix}$ is set according to actual requirements when the voltage to current converting circuit 100 is operating at a low supply voltage. Due to the fixed voltage $V_{fix}$ being fixed and the amplifier 110 having a characteristic of virtual short between two input terminals thereof, a linearity of the amplifier 110 will not be influenced when a supply voltage of the amplifier 110 is decreased. Therefore, because the amplifier 110 may operate in a virtual short status, the voltage to current converting circuit of the invention still has better linearity even if the supply voltage is very low. So, in actual embodiments, the voltage value of the fixed voltage is determined to make the amplifier being operated in a virtual short status.

Figure 1A:
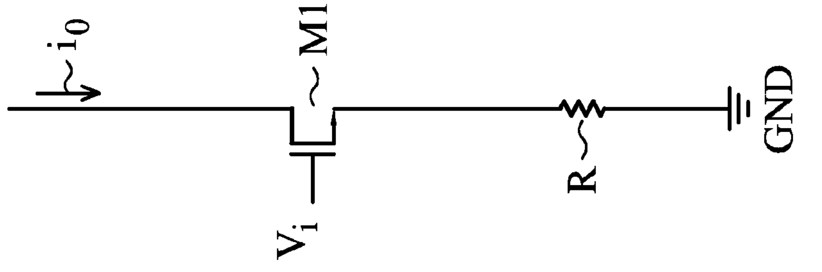
FIG. 1A ( PRIOR ART )
FIG. 1A shows a conventional transconductance circuit that operates in a single-end mode.
Figure 2B:
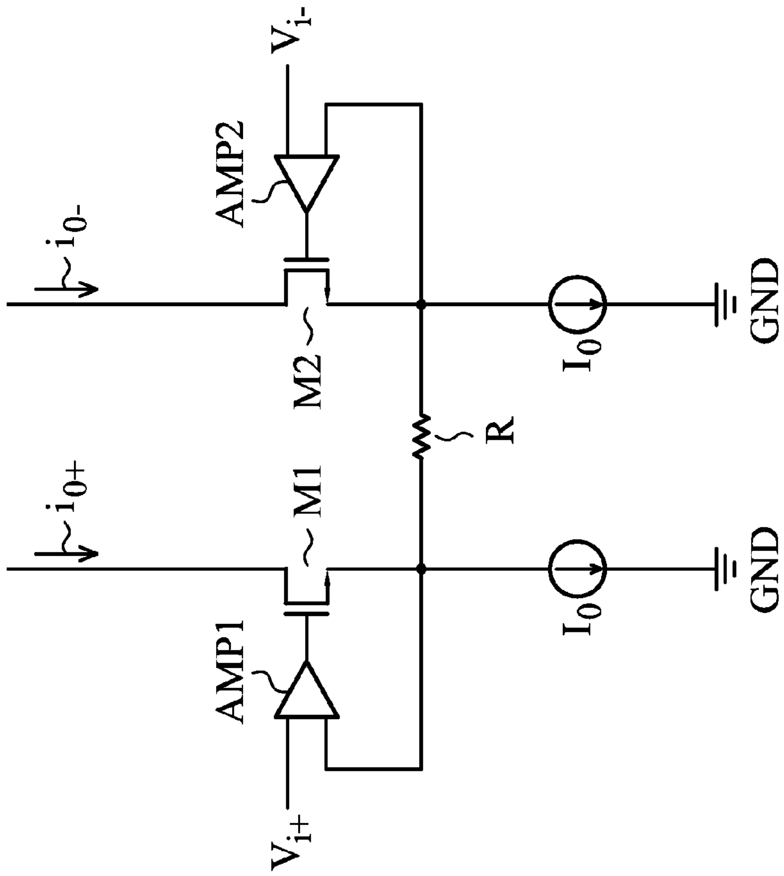
FIG. 2B ( PRIOR ART )
FIG. 2B shows another conventional transconductance circuit that operates in a differential mode.
Figure 2A:
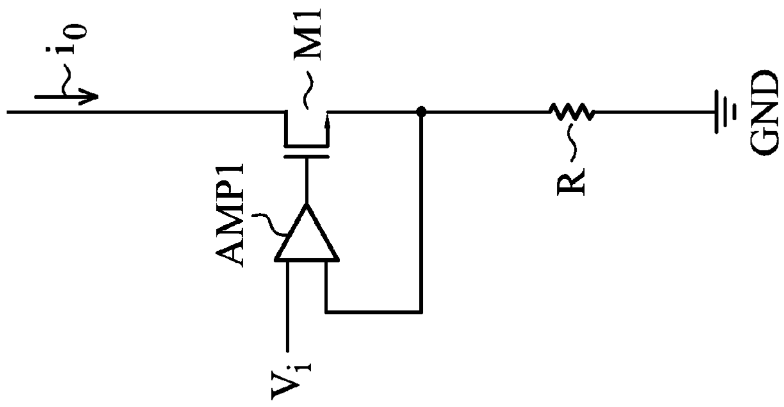
FIG. 2A ( PRIOR ART )
FIG. 2A shows another conventional transconductance circuit that operates in a single-end mode.
Figure 4A:
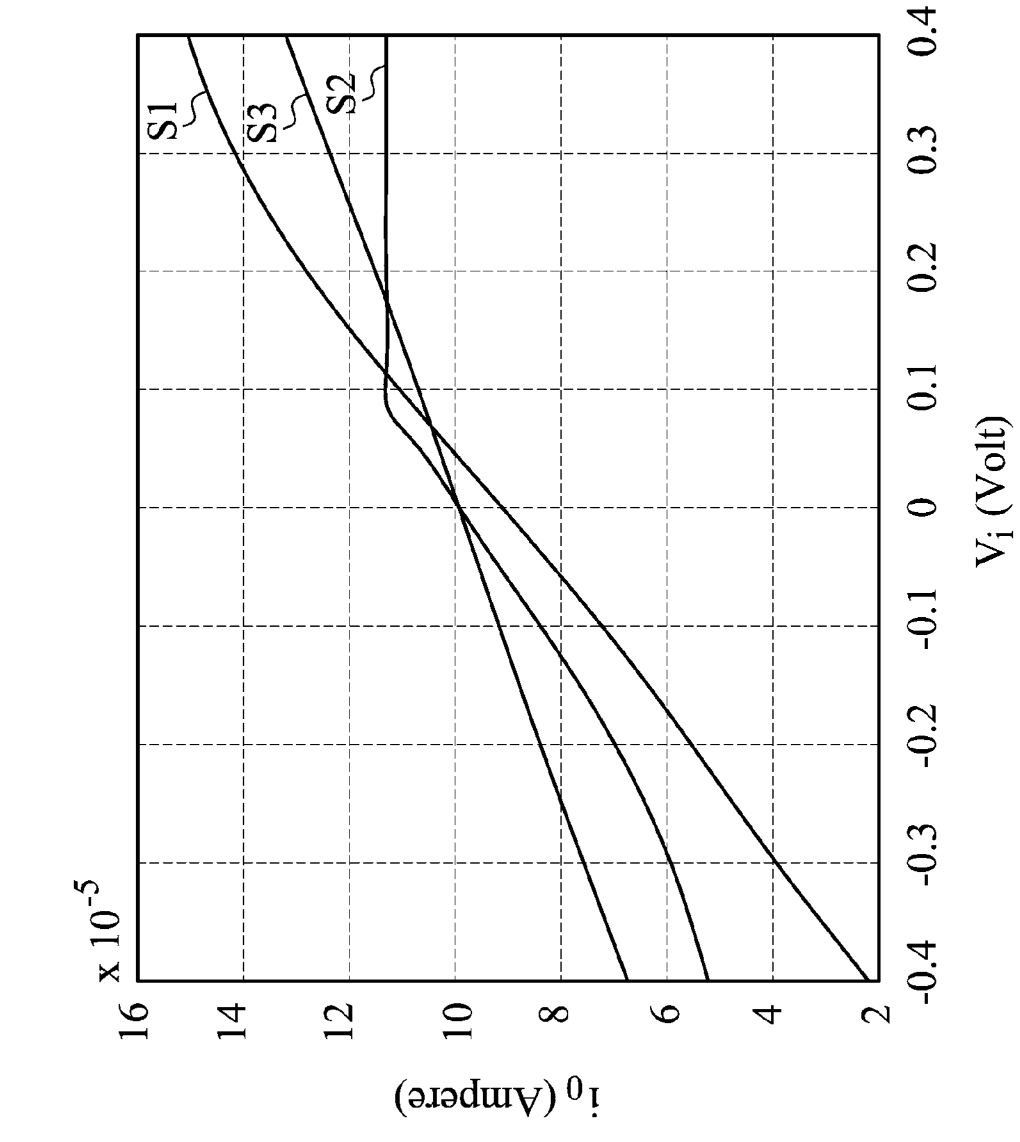
FIG. 4A shows a diagram illustrating the relationships between the input voltage $V_i$ and the output current $i_o$ of various transconductance circuits.
Figure 4B:
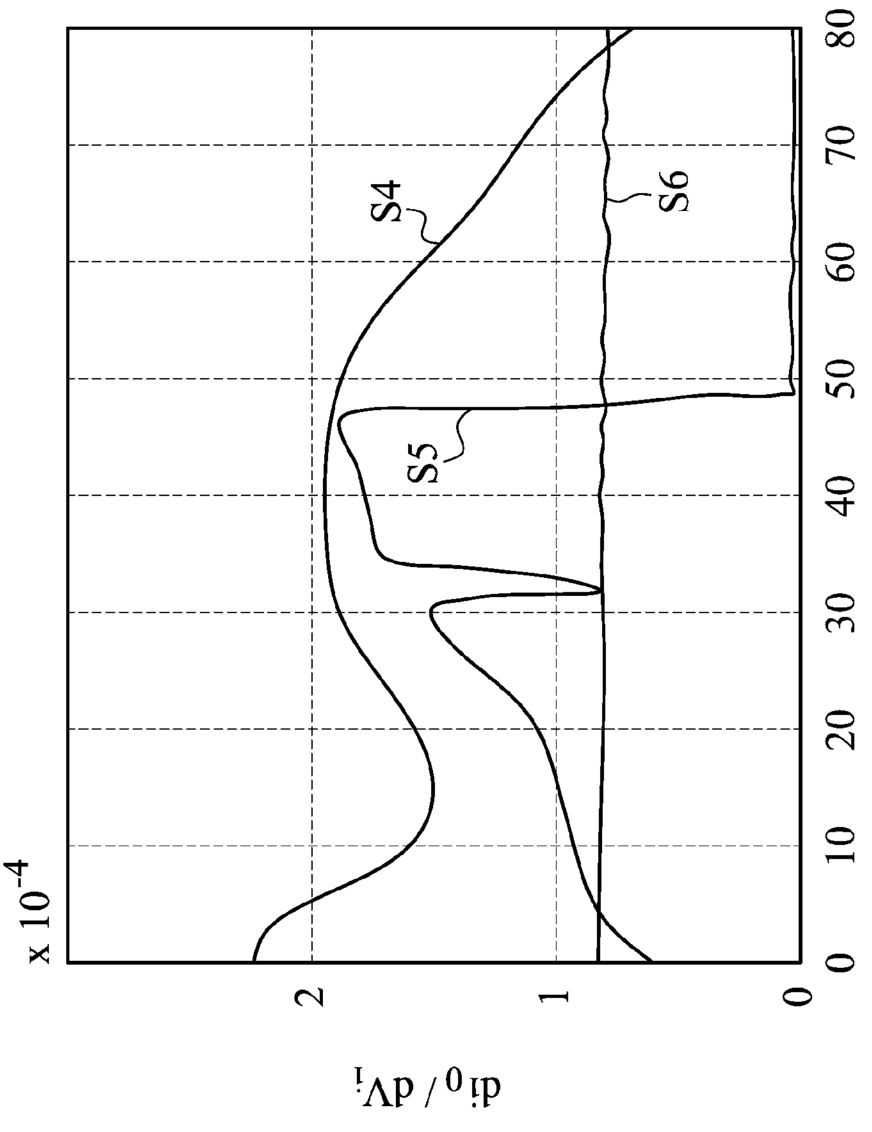
FIG. 4B shows a diagram illustrating the relationships of all the output currents $i_o$ of FIG. 4A differentiated with respect to the corresponding input voltages $V_i$.

FIG. 4A shows a diagram illustrating the relationships between the input voltage $V_i$ and the output current $i_o$ of various transconductance circuits. In FIG. 4A, the curve S1 represents the conventional transconductance circuit of FIG. 1A, the curve S2 represents the conventional transconductance circuit of FIG. 2A, and the curve S3 represents the voltage to current converting circuit 100 of FIG. 3. Furthermore, FIG. 4B shows a diagram illustrating the relationships of all the output currents $i_o$ of FIG. 4A differentiated with respect to the corresponding input voltages $V_i$. FIG. 4B is drawn by taking 80 voltage sampling points. Therefore the abscissa of FIG. 4B represents the number of those 80 sampling points, and every point in FIG. 4B should have the same voltage value as the corresponding point in FIG. 4A. In FIG. 4B, the curve S4 represents the conventional transconductance circuit of FIG. 1A, the curve S5 represents the conventional transconductance circuit of FIG. 2A, and the curve S6 represents the voltage to current converting circuit 100 of FIG. 3. Specifically, compared with the conventional transconductance circuits, the voltage to current converting circuit 100 of FIG. 3 has better linearity.

Figure 5:
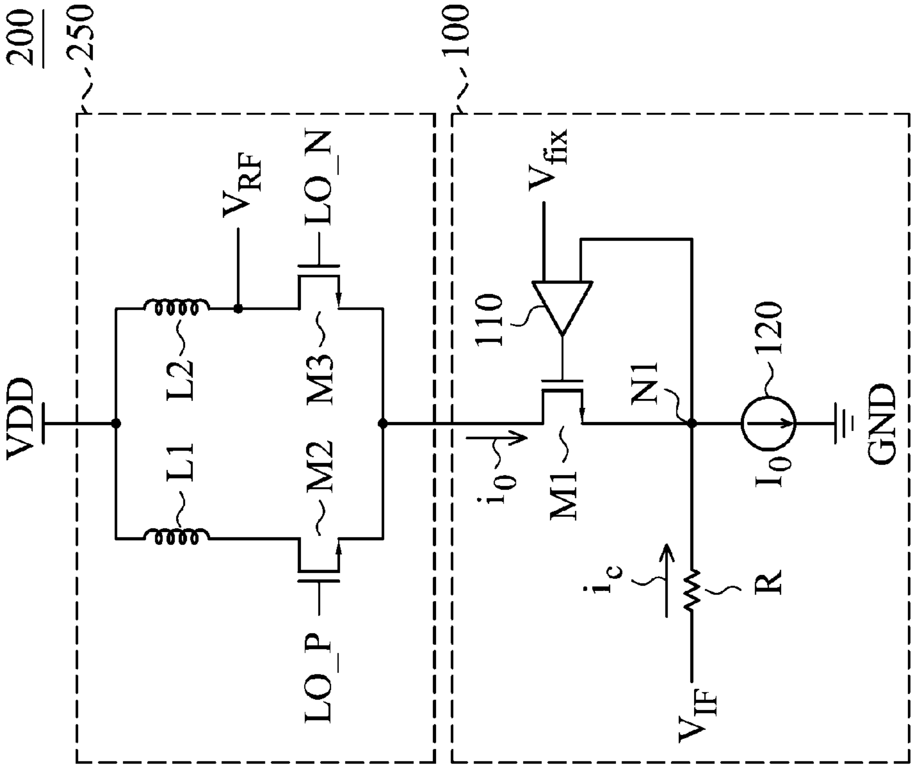
FIG. 5 shows a mixer according to an embodiment of the invention.

FIG. 5 shows a mixer 200 according to an embodiment of the invention. The mixer 200 comprises a differential voltage unit 250 and a voltage to current converting circuit 100. In general, a mixer of a radio frequency (RF) circuit can convert an intermediate frequency signal $V_{IF}$ from a digital to analog converter (DAC) into an RF signal $V_{RF}$, and then provide the RF signal $V_{RF}$ to a power amplifier (PA) (not shown). In the mixer 200, the voltage to current converting circuit 100 obtains an output current $i_o$ according to the received intermediate frequency signal $V_{IF}$ (i.e. an input voltage $V_i$). The differential voltage unit 250 comprises the transistors M2 and M3 and the inductors L1 and L2. The inductor L1 is coupled between a supply voltage VDD and the transistor M2, and the inductor L2 is coupled between the supply voltage VDD and the transistor M3. Furthermore, the transistor M2 is coupled between the inductor L1 and the voltage to current converting circuit 100, and the transistor M3 is coupled between the inductor L2 and the voltage to current converting circuit 100. The gates of the transistors M2 and M3 are used to receive the local oscillation signals LO_P and LO_N, wherein the local oscillation signals LO_P and LO_N are a pair of differential signals. Therefore, the differential voltage unit 250 generates the RF signal $V_{RF}$ according to the local oscillation signals LO_P and LO_N and the output current $i_o$. In the embodiment, a voltage level of the fixed voltage $V_{fix}$ is between the supply voltage VDD and the ground GND.

Figure 6:
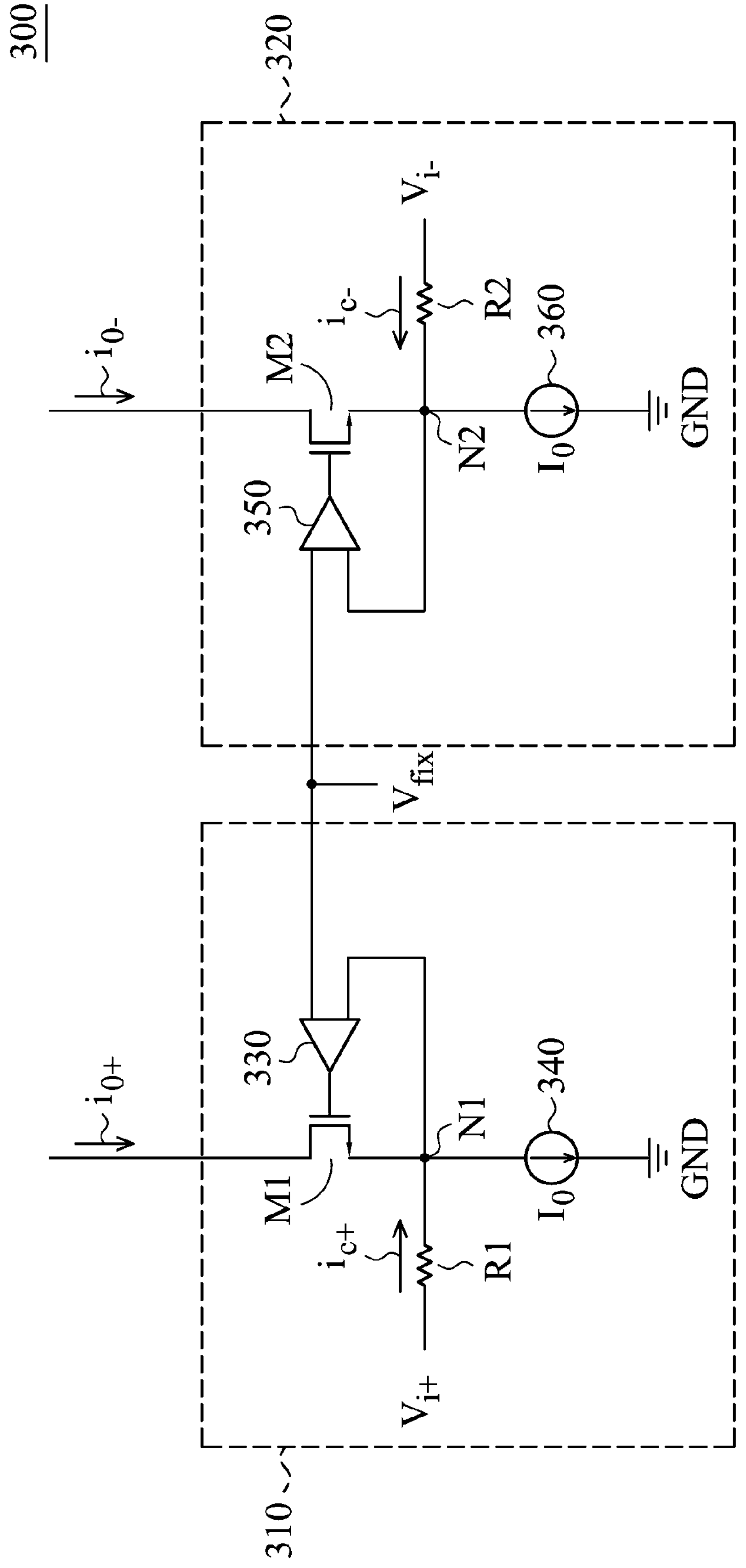
FIG. 6 shows a voltage to current converting circuit according to an embodiment of the invention, wherein the voltage to current converting circuit operates in a differential mode.

FIG. 6 shows a voltage to current converting circuit 300 according to an embodiment of the invention, wherein the voltage to current converting circuit 300 operates in a differential mode. The voltage to current converting circuit 300 comprises two voltage to current converting sub-circuits 310 and 320. The voltage to current converting sub-circuit 310 comprises a transistor M1, a resistor R1, an amplifier 330 and a current source 340, wherein the transistor M1 is an NMOS transistor. The transistor M1 being an NMOS transistor is an example and does not intend to limit the invention. The current source 340 is coupled between a ground GND and a node N1, wherein a current value of the current source 340 is $I_0$. An output terminal of the amplifier 330 is coupled to a gate of the transistor M1. A first input terminal of the amplifier 330 is used to receive a voltage $V_{fix}$, and a second input terminal of the amplifier 330 is coupled to the node N1. One terminal of the resistor R1 is also coupled to the node N1, and an input voltage $V_{i+}$ is applied to another terminal of the resistor R1. Thus, the input voltage $V_{i+}$ is not directly inputted to the gate of the transistor M1. Moreover, the current $i_{c+}$ flowing through the resistor R1 is $$\frac{V_{i+} - V_{fix}}{R1}.$$

Figure 1B:
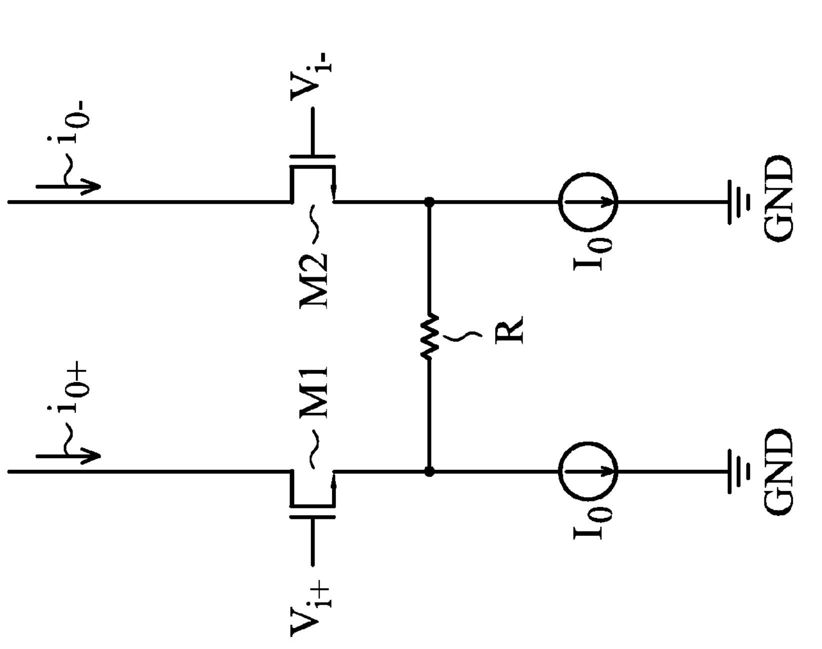
FIG. 1B ( PRIOR ART )
FIG. 1B shows a conventional transconductance circuit that operates in a differential mode.

Therefore, an output current $i_{o+}$ is obtained according to the current value $I_0$ of the current source 340 and the current $i_{c+}$ flowing through the resistor R1, i.e. $i_{o+}=I_0-i_{c+}$. On the other hand, the voltage to current converting sub-circuit 320 comprises a transistor M2, a resistor R2, an amplifier 350 and a current source 360, wherein the transistor M2 is an NMOS transistor and the transistors M1 and M2 have the same parameters. The transistor M2 being an NMOS transistor is an example and does not intend to limit the invention. The current source 360 is coupled between the ground GND and a node N2, wherein a current value of the current source 360 is identical to the current value of the current source 340. An output terminal of the amplifier 350 is coupled to a gate of the transistor M2, thereby the problems of the conventional transconductance circuit of FIG. 1B are avoided. A first input terminal of the amplifier 350 is used to receive the fixed voltage $V_{fix}$, and a second input terminal of the amplifier 350 is coupled to the node N2. One terminal of the resistor R2 is also coupled to the node N2, and an input voltage $V_{i-}$ is applied to the other terminal of the resistor R2. Thus, the input voltage $V_{i-}$ is not directly inputted to the gate of the transistor M2. Moreover, the current $i_{c-}$ flowing through the resistor R2 is $$\frac{V_{i-} - V_{fix}}{R2}.$$

Similarly, an output current $i_{o-}$ is obtained according to the current value $I_0$ of the current source 360 and the current $i_{c-}$ flowing through the resistor R2, i.e. $i_{o-}=I_0-I_{c-}$. In the embodiment, the input voltages $V_{i-}$ and $V_{i+}$ are a pair of differential signals. Therefore, the output currents $i_{o+}$ and $i_{o-}$ are also a pair of differential signals. It is to be noted that a direction of the current $i_{c+}$ or $i_{c-}$ is an example and does not intend to limit the invention. In actual applications, the directions of the current $i_{c+}$ and $i_{c-}$ are determined according to the input voltages $V_{i+}$ and $V_{i-}$ and the fixed voltage $V_{fix}$. Similar to the embodiment of FIG. 3, the fixed voltage $V_{fix}$ is set according to actual requirements when the voltage to current converting circuit 300 is operating at a low supply voltage. Because of the fixed voltage $V_{fix}$, each of the amplifiers 330 and 350 may be in a virtual short status even when the supply voltages of the amplifiers 330 and 350 are decreased. Therefore, because each of the amplifiers 330 and 350 would be operating in the virtual short status, the voltage to current converting circuit of the invention still has better linearity even if the supply voltage is very low. So, in actual embodiments, the voltage value of the fixed voltage is determined to make the first and second amplifiers being operated in a virtual short status.

Figure 7:
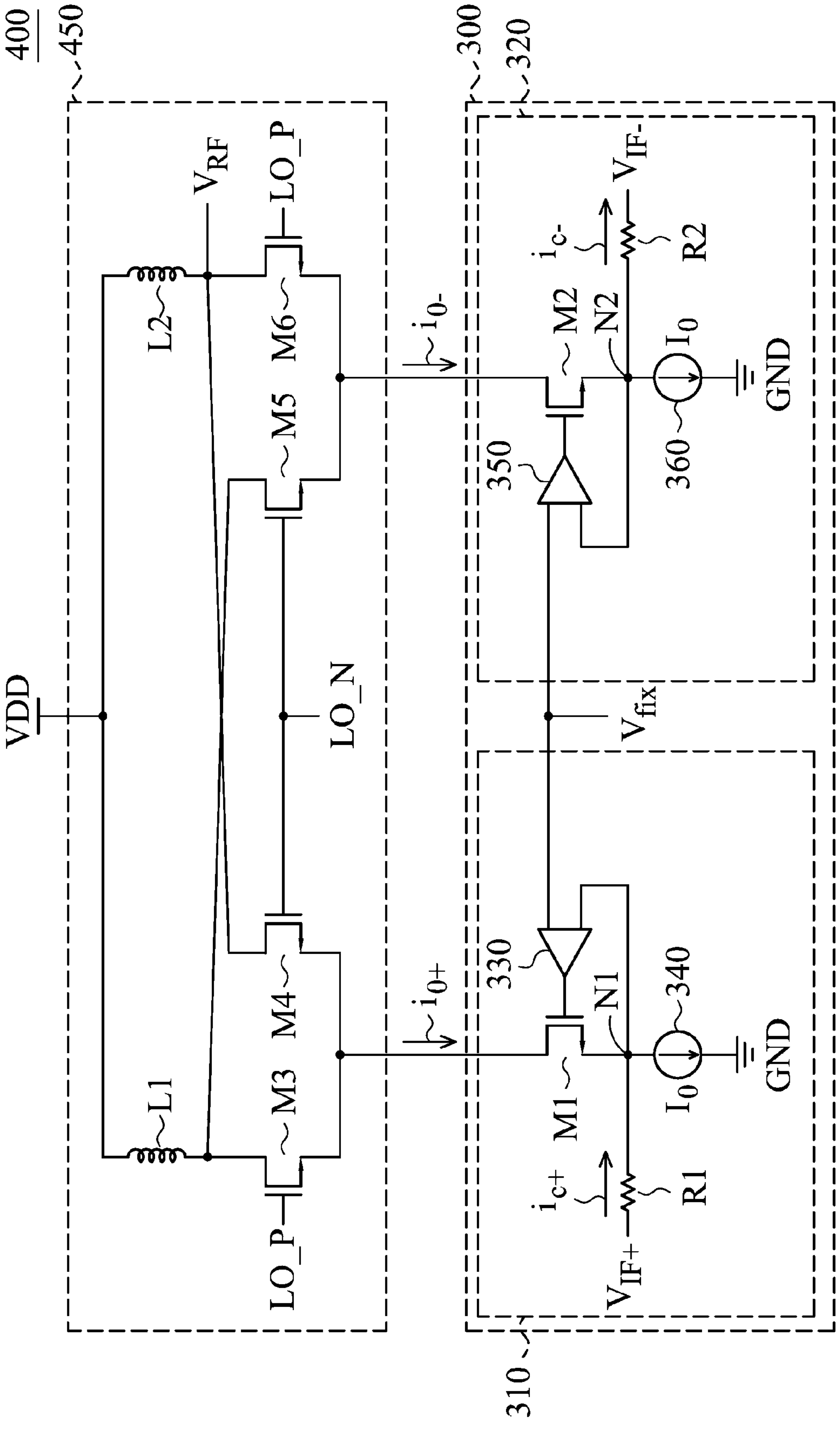
FIG. 7 shows a mixer according to another embodiment of the invention.

FIG. 7 shows a mixer 400 according to another embodiment of the invention. The mixer 400 comprises a differential voltage unit 450 and a voltage to current converting circuit 300. In the mixer 400, the voltage to current converting circuit 300 obtains the output currents $i_{o+}$ and $i_{o-}$ according to the received intermediate frequency signals $V_{IF+}$ and $V_{IF-}$ (i.e. the input voltages $V_{i+}$ and $V_{i-}$). The differential voltage unit 450 comprises the transistors M3, M4, M5 and M6 and the inductors L1 and L2. The inductors L1 and L2 are both coupled to the supply voltage VDD. The transistor M3 is coupled between the inductor L1 and the voltage to current converting sub-circuit 310, and the transistor M4 is coupled between the inductor L2 and the voltage to current converting sub-circuit 310. Furthermore, the transistor M5 is coupled between the inductor L1 and the voltage to current converting sub-circuit 320, and the transistor M6 is coupled between the inductor L2 and the voltage to current converting sub-circuit 320. The gates of the transistors M3 and M6 are used to receive a local oscillation signal LO_P, and the gates of the transistors M4 and M5 are used to receive a local oscillation signal LO_N, wherein the local oscillation signals LO_P and LO_N are a pair of differential signals. Therefore, the differential voltage unit 450 generates the RF signal $V_{RF}$ according to the local oscillation signals LO_P and LO_N and the output currents $i_{o+}$ and $i_{o+}$. In the embodiment, a voltage level of the fixed voltage $V_{fix}$ is between the supply voltage VDD and the ground GND.

Figure 8:
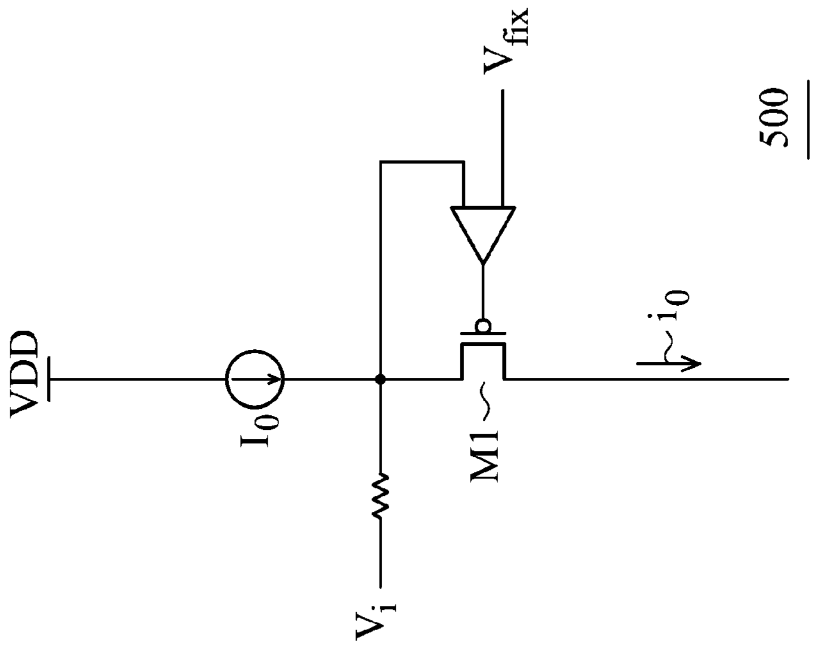
FIG. 8 shows a voltage to current converting circuit according to another embodiment of the invention, wherein the voltage to current converting circuit operates in a single-end mode.
Figure 9:
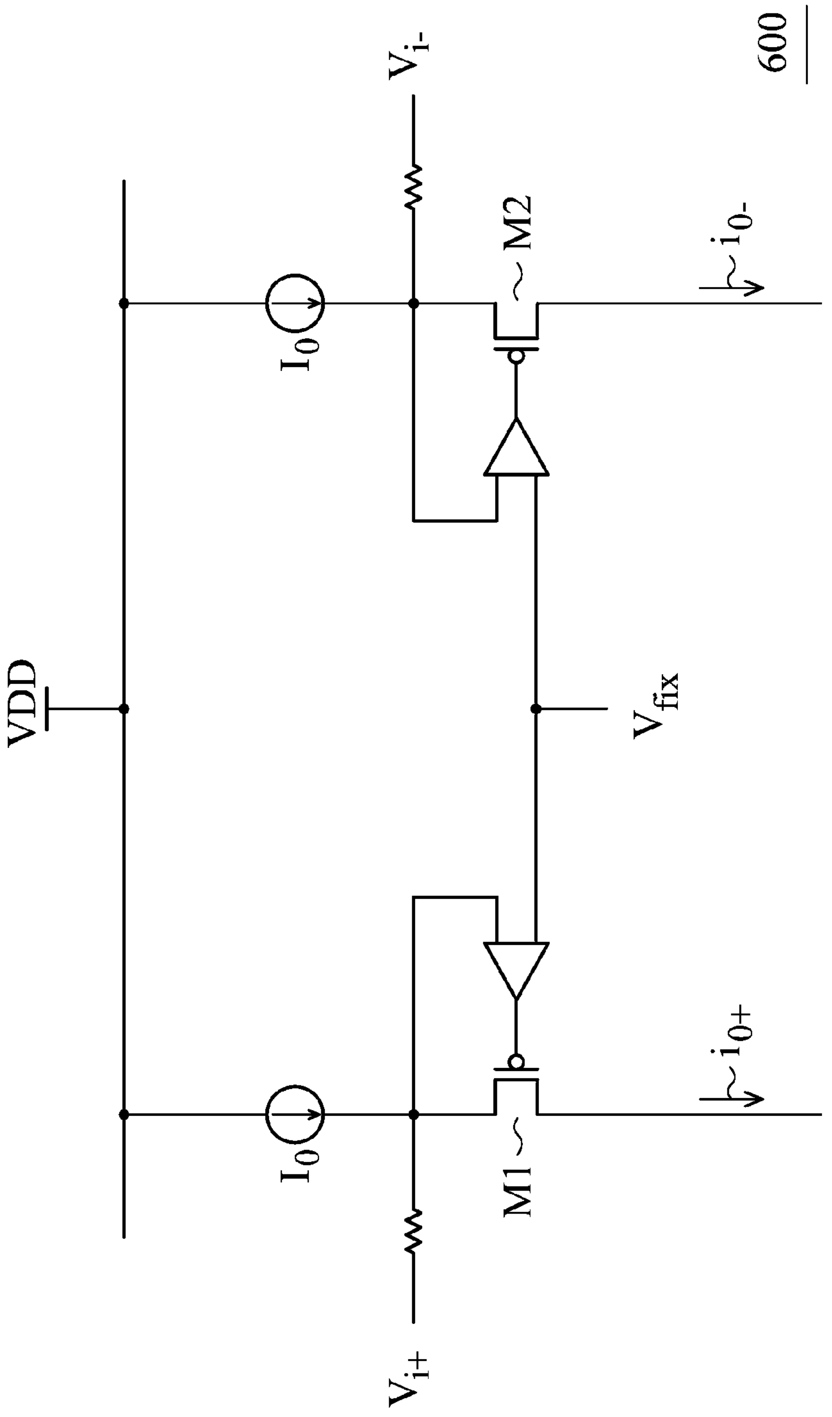
FIG. 9 shows a voltage to current converting circuit according to another embodiment of the invention, wherein the voltage to current converting circuit operates in a differential mode.

FIG. 8 shows a voltage to current converting circuit 500 according to another embodiment of the invention, wherein the voltage to current converting circuit 500 operates in a single-end mode. Compared with the voltage to current converting circuit 100 of FIG. 3, the voltage to current converting circuit 500 shows a circuit structure illustrating that the transistor M1 is a PMOS transistor. FIG. 9 shows a voltage to current converting circuit 600 according to another embodiment of the invention, wherein the voltage to current converting circuit 600 operates in a differential mode. Compared with the voltage to current converting circuit 300 of FIG. 6, the voltage to current converting circuit 600 shows a circuit structure illustrating that the transistors M1 and M2 are PMOS transistors.

In the embodiments of the invention, the transistors (e.g. the transistors M1 and M2) of the voltage to current converting circuits are controlled by the amplifiers of the voltage to current converting circuits. Because the input voltage $V_i$ is directly inputted to the resistor R and the voltage $V_{fix}$ is a predetermined fixed voltage, the amplitude variable of the input voltage $V_i$ can not affect the gain of the amplifier. Therefore, at a low operating/supply voltage, the voltage to current converting circuits of the invention has better linearity.

While the invention has been described by way of example and in terms of the preferred embodiments, it is to be understood that the invention is not intend to limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A converting circuit for converting an input voltage into an output current, comprising:

a transistor, coupled to a supply voltage at a drain of the transistor, and a source of the transistor is coupled to a first voltage;

a resistor, coupled to the source of the transistor, receiving the input voltage, wherein the output current flows through the resistor; and an amplifier, having a first input terminal for receiving a fixed voltage, a second input terminal coupled to the source of the transistor, and an output terminal coupled to a gate of the transistor, wherein the output current is related to the fixed voltage, the input voltage and the resistor, and the fixed voltage has a predetermined fixed voltage level independent of the input voltage, wherein the drain of the transistor is coupled to the supply voltage via a differential voltage unit, and wherein the converting circuit and the differential voltage unit mixing an input voltage of the differential voltage unit and the input voltage and generating the output current.

2. The converting circuit as claimed in claim 1, wherein the source of the transistor is coupled to the first voltage through a current source.

3. The converting circuit as claimed in claim 2, wherein a first terminal of the resistor is further coupled to the source of the transistor and the current source, and a second terminal of the resistor is coupled to the input voltage.

4. The converting circuit as claimed in claim 1, wherein the first voltage is a ground.

5. The converting circuit as claimed in claim 1, wherein a voltage value of the fixed voltage is determined to make the amplifier being operated in a virtual short status.

6. A converting circuit for converting a plurality of input voltages into a plurality of output currents, comprising:

a first transistor, coupled to a first supply voltage at a drain of the first transistor, and a source of the first transistor is coupled to a first voltage;

a first amplifier, having a first input terminal for receiving a fixed voltage, a second input terminal coupled to the source of the first transistor, and an output terminal coupled to a gate of the first transistor;

a first resistor, coupled to the source of the first transistor and the second input terminal of the first amplifier, receiving a first input voltage, wherein a first output current flows through the first resistor;

a second transistor, coupled to a second supply voltage at a drain of the second transistor, and a source of the second transistor is coupled to a second voltage;

a second amplifier, having a first input terminal for receiving the fixed voltage, a second input terminal coupled to the source of the second transistor, and an output terminal coupled to a gate of the second transistor; and a second resistor, coupled to the source of the second transistor and the second input terminal of the second amplifier, receiving a second input voltage, wherein a second output current flows through the second resistor, wherein the fixed voltage has a predetermined fixed voltage level independent of the input voltage, wherein the first and second transistors are coupled to a third supply voltage via a differential voltage unit, and wherein the converting circuit and the differential voltage unit mixing a input voltage of the differential voltage unit, the first input voltage and the second input voltage, and generating the first output current and the second output current.

7. The converting circuit as claimed in claim 6, wherein the first input voltage and the second input voltage are a pair of differential signals.

8. The converting circuit as claimed in claim 6, wherein the first voltage and the second voltage are ground.

9. The converting circuit as claimed in claim 6, wherein a voltage value of the fixed voltage is determined to make the first amplifier and the second amplifier being operated in a virtual short status.

10. The converting circuit as claimed in claim 6, further comprising:

a current source coupled between the first voltage and the source of the first transistor.

11. The converting circuit as claimed in claim 10, wherein a first terminal of the first resistor is coupled to the source of the first transistor, the second terminal of the first amplifier and the current source, and a second terminal of the first resistor is coupled to the first input voltage.

12. The converting circuit as claimed in claim 6, further comprising:

a current source coupled to the second voltage and the source of the second transistor.

13. The converting circuit as claimed in claim 12, wherein a first terminal of the second resistor is coupled to the source of the second transistor, the second terminal of the second amplifier and the current source, and a second terminal of the second resistor is coupled to the second input voltage.

* * * * *